Dec. 18, 1951  F. CARRERA  2,579,448
FOLDABLE AND EXTENSIBLE TRANSPORTING DEVICE
Original Filed March 14, 1947  2 SHEETS—SHEET 1

INVENTOR
Fernando Carrera
BY
ATTORNEY

Dec. 18, 1951 F. CARRERA 2,579,448
FOLDABLE AND EXTENSIBLE TRANSPORTING DEVICE
Original Filed March 14, 1947 2 SHEETS—SHEET 2
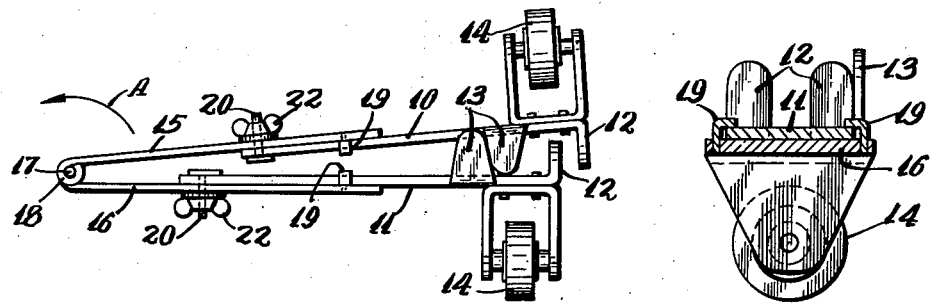
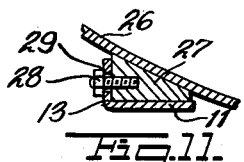
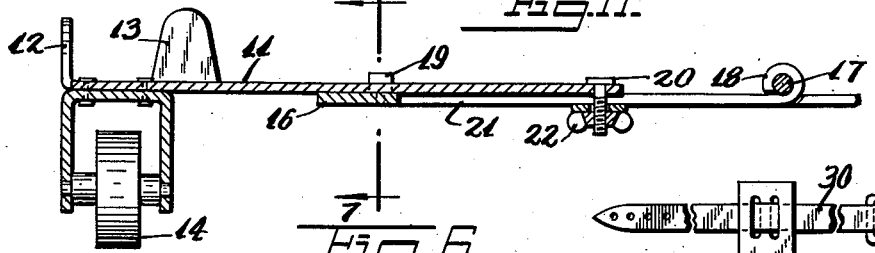
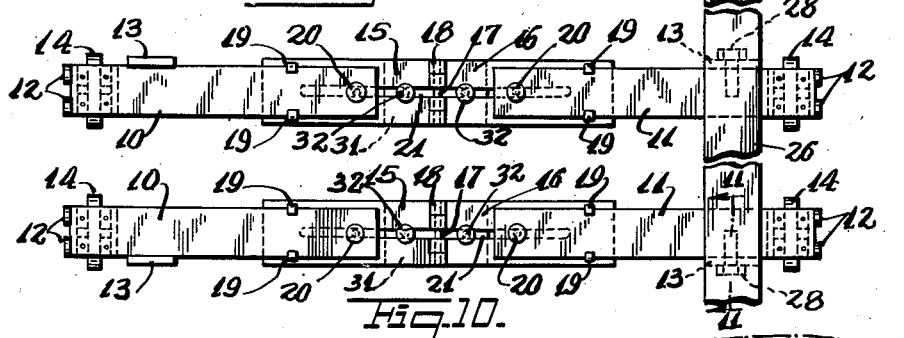
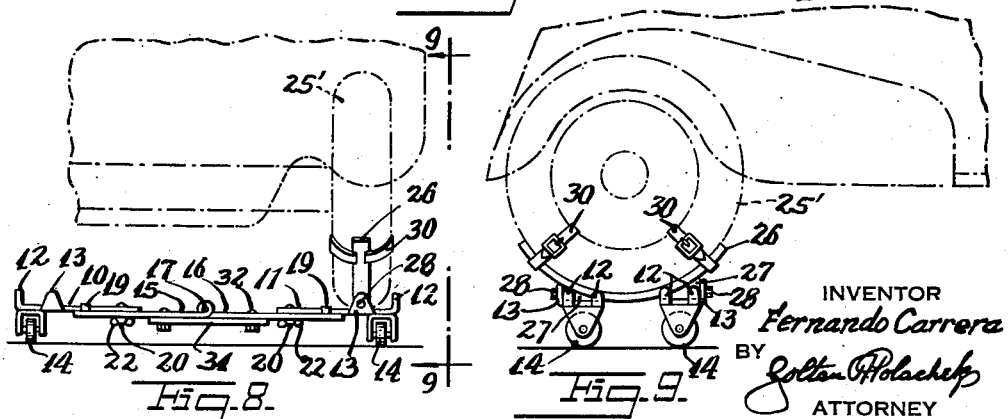
INVENTOR
*Fernando Carrera*
BY
ATTORNEY Patented Dec. 18, 1951

2,579,448

UNITED STATES PATENT OFFICE 2,579,448

FOLDABLE AND EXTENSIBLE TRANSPORTING DEVICE

Fernando Carrera, San Francisco, Calif.

Substituted for abandoned application Serial No. 734,711, March 14, 1947. This application September 21, 1950, Serial No. 186,025

4 Claims. (Cl. 280—35)

This invention relates to new and useful improvements in a transporting device.

This application is a substitute for my abandoned application filed on March 14, 1947, Serial No. 734,711.

The invention proposes a transporting device which may be conveniently used to support and carry crates, boxes, luggage and which may be combined in a novel manner to facilitate movement of a motor vehicle having a flat tire.

More specifically, the invention proposes to characterize the transporting device by a pair of end support members longitudinally spaced from each other and connected in a certain way and provided with gripping elements for engaging the load, and also provided with casters by which the load may be supported upon the ground or floor and rolled or pushed along.

The invention proposes that one or more of the carriers be combined to receive and support the flat tire of a motor vehicle permitting movement of the car to a service station.

Still further it is proposed to further characterize the transporting device by a pair of pivotally connected strips adjustably connected with the support members which are provided with the casters so that the transporting device may be folded when not in use.

Still further the invention proposes an embodiment of the transporting device to adapt it to support a wheel or wheels of an automobile so that the automobile may be towed or pushed when this is required.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 5 is a side elevational view of the transporting device completely folded.

Fig. 6 is a fragmentary enlarged sectional view taken on the line 6—6 of Fig. 3.

Fig. 7 is a vertical sectional view taken on the line 7—7 of Fig. 6.

Fig. 8 is an elevational view showing the manner of combining two of the transporting devices to support an automobile wheel which is schematically illustrated.

Fig. 9 is a side elevational view of Fig. 8 looking in the direction of the line 9—9 thereof.

Fig. 10 is an enlarged plan view of the wheel supporting device illustrated in Figs. 8 and 9.

Fig. 11 is a fragmentary vertical sectional view taken on the line 11—11 of Fig. 10.

Figure 1:
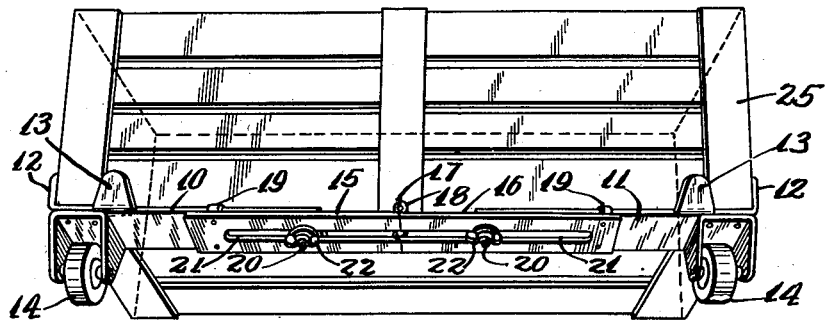
Fig. 1 is a perspective view of a crate supported at one end by a transporting device constructed in accordance with this invention.
Figure 2:
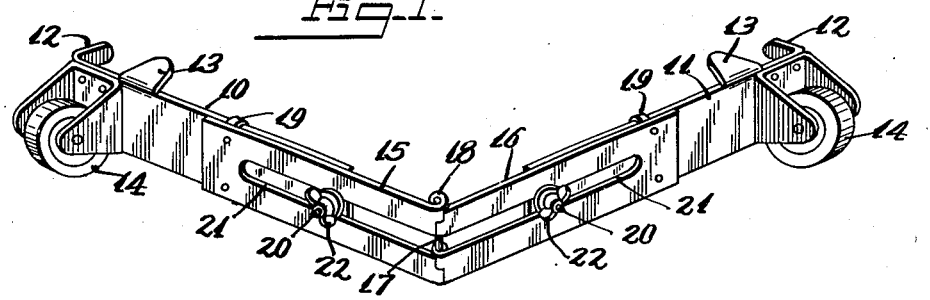
Fig. 2 is a perspective view of the transporting device shown in Fig. 1, partially folded and illustrated turned on one side.
Figure 3:
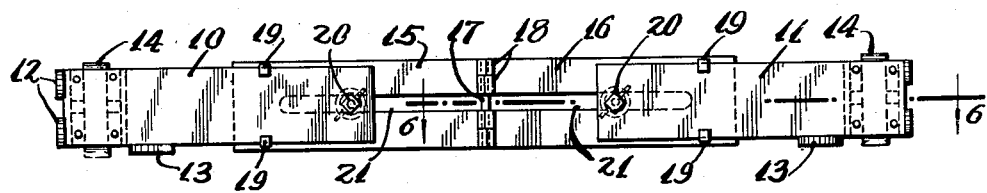
Fig. 3 is a plan view of the transporting device.
Figure 4:
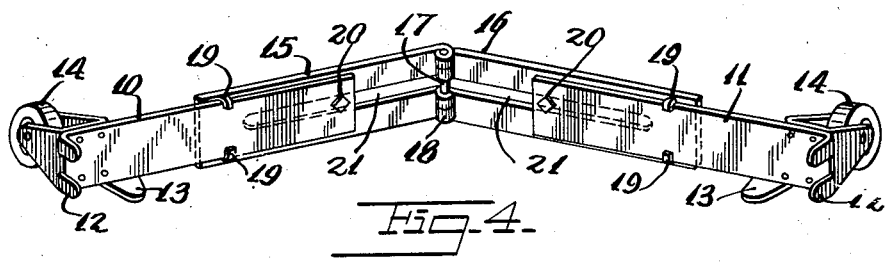
Fig. 4 is a perspective view of the transporting device turned on one side so that the top is near the viewer, and illustrated partially folded.

The transporting device, in accordance with this invention, includes a pair of end support members 10 and 11 normally longitudinally spaced from each other and provided with gripping elements 12 and 13 for engaging a load. Wheels 14 are mounted on the bottom of said support members 10 and 11. A pair of pivotally connected strips 15 and 16 are adjustably connected with the said end support members 10 and 11.

The strips 15 and 16 are pivotally connected with each other by a pintle pin 17 and coil portions 18 formed on the adjacent ends of the strips and engaged around the pintle pin 17. The strips 15 and 16 are adjustably connected with the end support members 10 and 11 by lugs 19 formed on the edge portions of one of these parts and engaging the edges of the other of the parts. Fastening elements 20, such as screws, are mounted on one of the parts and engage through slots 21 formed on the other of the parts. Wing nuts 22 engage the screws 20 and normally abut the edges of the slots 21. These wing nuts serve to clamp the strips 15 and 16 in adjusted positions on the end support members 10 and 11.

The gripping elements 12 comprise a pair of spaced lugs upon the outer ends of the support members 10 and 11. The gripping elements 13 comprise lugs upon one of the sides of the said end support members 10 and 11 near the outer ends thereof.

The operation of the transporting device may be best understood by examining Fig. 1 and noting the device is shown engaged beneath the bottom corner of a crate 25. It is pointed out that the transporting device may be adjusted in width to accommodate the width of the crate 25. While one device has been illustrated it should be clearly understood that an additional one may be used upon the remote end of the crate 25. When the transporting device is not in use it may be folded to a smaller compass as illustrated in Fig. 5. The arrow indicated by reference numeral A indicates the direction in which the top portion of the transporting device may be pivoted to place the device into operative position.

In Figs. 8 to 11 an embodiment of the invention is disclosed wherein two of the transporting devices are combined in a novel manner to support an automobile wheel schematically indicated by reference numeral 25'. In this embodiment two transporting devices, as illustrated in Figs. 1 to 7, are used. These devices are disposed parallel to each other and slightly laterally spaced and joined together with an arcuate member 26. This arcuate member is provided with a pair of spaced lugs 27 provided with fastening screws 28 normally engaged through openings 29 in the gripping elements 13 of the load carrier units. The arcuate member 26 is also provided with several straps 30 adapted to engage around the tire and rim of the wheel 25'. The arcuate member 26 is of a shape to conform with the bottom portion of the wheel as shown in Figs. 8 and 9, or it is flexible so that it may be forced to conform with this shape.

Means is provided for holding the strips 15 and 16 of the load carrier units stationarily in a common plane to facilitate the support of the wheel 25'. This means comprises rigid strips 31 extended across the pivots of the strips 15 and 16 and secured in position by fastening elements 32 such as bolts and nuts which engage through the slots 21.

In Figs. 8 and 9 the combined transporting devices are shown supporting the wheel 25. Should the inner ends of the load carrier units pass over lumps or rocks in the road it will merely pivot upwards over such obstructions. However, exceptionally large obstructions must be avoided.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A transporting device, comprising a support unit including a pair of end support members longitudinally spaced from each other and provided with gripping elements, wheels mounted on the bottom of said support members, and a pair of pivotally connected strips adjustably connected with said support members, another support unit identical to said first-mentioned support unit and spaced laterally thereof, an arcuate member removably mounted across one of the ends of said support units between said gripping elements and provided with lugs secured to said gripping elements, and means for releasably holding said pivotally connected strips stationarily in a common plane.

2. A transporting device, comprising a support unit including a pair of end support members longitudinally spaced from each other and provided with gripping elements, wheels mounted on the bottom of said support members, and a pair of pivotally connected strips adjustably connected with said support members, another support unit identical to said first-mentioned support unit and spaced laterally thereof, an arcuate member removably mounted across one of the ends of said support units between said gripping elements and provided with lugs secured to said gripping elements, means for releasably holding said pivotally connected strips stationarily in a common plane, and straps mounted at spaced points on said arcuate member by which it may be attached to a wheel.

3. A transporting device, comprising a support unit including a pair of end support members longitudinally spaced from each other and provided with gripping elements, wheels mounted on the bottom of said support members, and a pair of pivotally connected strips adjustably connected with said support members, another support unit identical to said first-mentioned support unit and spaced laterally thereof, an arcuate member removably mounted across one of the ends of said support units between said gripping elements and provided with lugs secured to said gripping elements, and means for releasably holding said pivotally connected strips stationarily in a common plane, said holding means comprising rigid strips extended across said pivotally connected strips and fixedly secured thereon.

4. A transporting device, comprising a support unit including a pair of end support members longitudinally spaced from each other and provided with gripping elements, wheels mounted on the bottom of said support members, and a pair of pivotally connected strips adjustably connected with said support members, another support unit identical to said first-mentioned support unit and spaced laterally thereof, an arcuate member removably mounted across one of the ends of said support units between said gripping elements and provided with lugs secured to said gripping elements, means for releasably holding said pivotally connected strips stationarily in a common plane, and straps mounted at space points on said arcuate member by which it may be attached to a wheel.

FERNANDO CARRERA.

REFERENCES CITED

The following references are of record in the file of this patent:

UNITED STATES PATENTS

| Number | Name | Date |
| --- | --- | --- |
| 1,261,681 | Barnett | Apr. 2, 1918 |
| 1,887,067 | Pehrsson | Nov. 8, 1932 |
| 1,893,436 | Prescott | Feb. 21, 1933 |